United States Patent [19]

Farmer et al.

[11] Patent Number: 4,973,511

[45] Date of Patent: Nov. 27, 1990

[54] COMPOSITE SOLAR/SAFETY FILM AND LAMINATED WINDOW ASSEMBLY MADE THEREFROM

[75] Inventors: Peter H. Farmer, Longmeadow; Stanley S. Ho; Raymond F. Riek, both of Wilbraham, all of Mass.; Floyd E. Woodard, Olivette, Mo.

[73] Assignee: Monsanto Company, St. Louis, Mo.

[21] Appl. No.: 278,576

[22] Filed: Dec. 1, 1988

[51] Int. Cl.$^5$ .......................... B32B 7/02; B32B 15/08
[52] U.S. Cl. ..................................... 428/216; 428/332; 428/334; 428/337; 428/343; 428/412; 428/423.1; 428/426; 428/457; 428/500; 428/522; 428/523
[58] Field of Search ..................... 428/457, 412, 423.1, 428/426, 216, 332, 337, 522, 523, 500, 343, 334

[56] References Cited

U.S. PATENT DOCUMENTS

| | | |
|---|---|---|
| 3,679,291 | 7/1972 | Apfel et al. |
| 4,368,945 | 1/1983 | Fujimori et al. ...................... 350/1.7 |
| 4,414,254 | 11/1983 | Iwata et al. ...................... 428/458 X |
| 4,465,736 | 8/1984 | Nishihara et al. ................... 428/332 |
| 4,765,729 | 8/1988 | Taniguchi ........................... 351/163 |
| 4,786,783 | 11/1988 | Woodard ............................ 219/547 |
| 4,799,745 | 1/1989 | Meyer et al. ........................ 350/1.7 |

Primary Examiner—Thomas J. Herbert
Attorney, Agent, or Firm—Michael J. Murphy; William J. Farrington

[57] ABSTRACT

A laminated window construction includes a solar control film formed by a flexible plastic substrate such as a PET sheet having on one surface a multilayer solar coating. This multilayer solor coating includes at least one thin layer of metal and at least one adjacent adherent layer of a dielectric material. An energy absorbing safety film of the type normally used in shatterproof glass laminates (e.g., plasticized PVB) is bonded to at least one side, and preferably both sides, of the solar control film to form a composite solar/safety film. This composite solar/safety film is specially designed to contribute, after incorporation into a glass laminate, no more than about two percent of visible reflection (based on total incident visible radiation) which has the effect of substantially masking the visible effects of wrinkles in the solar control film substrate (i.e., the wrinkles are made less visible). This low level of visible reflection contribution is achieved by careful control of the optical properties of the solar control film, the safety film or both. Outer layer transparent glass panes are laminated to one or both sides of the composite solar/safety film to provide a safety window which in one preferred embodiment is a windshield having at least seventy percent normal visible light transmissibility, and a total reflection of visible light of generally less than ten percent.

38 Claims, 7 Drawing Sheets

COMPOSITE SOLAR/SAFETY FILM AND LAMINATED WINDOW ASSEMBLY MADE THEREFROM

BACKGROUND OF THE INVENTION

The present invention relates to encapsulated solar reflecting films for use in laminated window assemblies and more particularly to shatterproof window assemblies having a safety glass type of construction. It further relates to shatterproof laminated window assemblies having high reflection of solar radiation without sacrificing optical properties and defrosting capabilities. The invention finds particular utility in automotive window applications, and in particular for windshield products.

Solar reflecting window assemblies have found application in numerous areas where one objective is to manage internal heat loads by reflecting a portion of the solar spectrum which causes heating, e.g., the near infrared. This technology has been employed, for example, in commercial and residential glazing products and more recently in automotive window products.

The surface areas of automotive windows (front, side and rear) exposed to sunlight have increased in recent years due to the new stylish and aerodynamic vehicle body designs with severely sloping front and rear windows. This increase has resulted in greater heat inside of the vehicles during sunny days and greater frosting, icing and fogging of the windows during the colder days and nights. To reduce the heating effects resulting from such windows, selective light transmitting materials or films have been incorporated into window assemblies. These films have generally been designed to maximize rejection of incoming light in the near infrared wavelength range. Selective light transmitting films are disclosed, for example, in U.S. Pat. Nos. 4,166,876, 4,226,910 and 4,234,654. (The disclosures of these patents and the other patents and applications mentioned herein are hereby incorporated by reference in their entireties.) Electrically-heatable laminated windows to remedy the frosting, icing and fogging problems have been designed and such are disclosed in, for example, U.S. Pat. No. 4,017,661 and pending application Ser. Nos. 07/084,274 and 07/084,600, both filed Aug. 19, 1987, and entitled "Electrically Heatable Laminated Window," of the present assignee.

Further, it is known to provide a safety glass type of construction which is resistant to shatter upon impact by making a laminated window assembly incorporating a flexible plastic safety film (e.g., polyvinyl butyral, PVB) between a pair of glass layers. By including a thin electrically-conductive metal coating in this construction, the safety glass of windshield can also have electrically-powerable defrosting capabilities as previously mentioned. This type of coating is disclosed, for example, in U.S. Pat. Nos. 3,718,535, 3,816,201, 3,962,488 and 4,017,661.

Safety glass type windows, which include the metal layer-containing solar rejection films, reflect heat, control solar radiation, and optionally conduct electricity for defrosting capabilities. Providing such a structure on a commercial scale, however, heretofore has been difficult due to problems associated with lamination, In a typical construction, the solar control film is itself of multilayer design with a number (e.g., three, five, seven or more) of functional coatings on a flexible plastic substrate or carrier layer. This substrate layer, typically polyethylene terephthalate (PET), while transparent, tends to wrinkle during bonding to the safety film (e.g., PVB) and/or lamination of the resulting composite solar/safety film between two additional glass layers using conventional lamination techniques employed for safety glass laminates. These wrinkles, which are particularly noticeable at oblique viewing angles, render the resulting windshield unacceptable because a wrinkled layer in the laminate produces optically non-uniform surfaces which result in distorted reflected images.

One attempt of the prior art to deal with this optical problem is described in U.S. Pat. No. 4,465,736 which uses a solar reflecting coating on a substrate which is heat shrinkable within certain carefully prechosen limits. The major problem with this approach is the potential for unequal thermal shrinkage of the substrate film and the coatings, which an cause the coatings to become discontinuous. discontinuities in the coating can result in degradation of both electrical properties (i.e., higher resistance) and optical properties (i.e., an increase in the scattering of visible light).

SUMMARY OF THE INVENTION

Accordingly, it is a principal object of the present invention to provide a composite solar/safety film which, when included in a laminated safety glass window assembly, exhibits good solar rejection characteristics and acceptably low visible distorted reflection images from wrinkles in the solar control film.

Another object of this invention is to provide a laminated safety glass window assembly containing a solar control film, this assembly exhibiting high reflection of near infrared solar radiation and acceptably low visible distorted reflection images from wrinkles in the solar control film.

A further object of the present invention is to provide an improved safety-glass type electrically-conductive vehicle windshield containing an optical element capable of high luminous transmittance of more than seventy percent and low reflected color, particularly at oblique viewing angles, and reduction of transmitted, near infrared solar radiation to minimize the heat buildup within the vehicle.

Directed to achieving these objects, an improved laminated window construction is provided herein. This window includes a solar control film formed by a flexible plastic substrate such as a PET film having on one surface a multilayer solar coating. This multilayer solar coating comprises at least one thin layer of metal and at least one adjacent adherent layer of a dielectric material. The solar coating may be deposited on the substrate, for example, by vacuum coating techniques. An energy absorbing safety film of the type normally used in shatterproof glass laminates (e.g., PVB) is bonded to at least one side, and preferably both sides, of the solar control film to form a composite solar/safety film. This composite solar/safety film is specially designed to contribute, after incorporation into a glass laminate, no more than about two percent of visible reflection (based on total incident visible radiation) which has the effect of substantially masking the visible effects of wrinkles in the solar control film substrate (i.e., the wrinkles are made less visible). This low level of visible reflection contribution is achieved by careful control of the optical properties of the solar control film, the safety film or both. Outer layer transparent glass panes are laminated to one or both sides of the composite solar/safety film to provide a safety window which in one preferred embodiment is a windshield having at least seventy percent normal visible light transmissiblity, as specified in ANSI Z26.1 and required in the U.S. automotive industry, and more particularly having a total reflection of visible light of generally less than ten percent.

Other objects and advantages of the present invention will become more apparent to those persons having ordinary skill in the art from the foregoing description taken in conjunction with accompany drawings.

DETAILED DESCRIPTION OF PREFERRED EMBODIMENTS OF THE INVENTION

Figure 1:
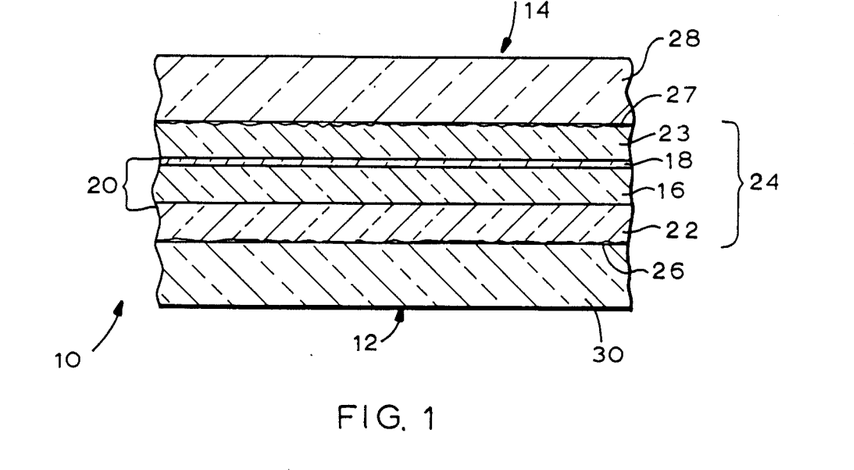
FIG. 1 is a cross-sectional view of one embodiment of a safety glass laminate of the present invention.

Referring to FIG. 1, a solar reflecting safety glass laminate of the present invention is shown generally at 10. This laminate can be used in architectural applications, e.g., commercial or residential glazing, or in vehicle (e.g., automotive) applications, such as windshields, or side and rear windows. In the following description this laminate will be described primarily in the context of automotive windshield applications.

The first described element of the laminate of this invention is substrate layer 16. This substrate layer serves as a carrier for solar coatings 18 and together substrate 16 and coatings 18 comprise the solar control film 20. Substrate 16 should be flexible, transparent plastic material, that has suitable thermal characteristics to maintain its integrity and transparency under the conditions employed in subsequently described coating, bonding and laminating steps. The substrate material should also be chosen to provide a refractive index that is close to that of glass. Known preferred materials of this class exhibit varying amounts of minute wrinkling under the outlined processing conditions and this invention achieves its primary advantage in the case of such wrinkle-prone substrate materials.

Among the suitable film forming plastic materials for substrate 16 are biaxially oriented polyesters, such as polyethylene terephthalate (PET), nylons, polyurethanes, acrylics, polycarbonates, polyolefins such as polypropylenes, cellulose acetates and triacetates, vinyl chloride polymers and copolymers and the like. The preferred substrate material is PET.

The thickness of substrate 16 is not critical and will depend on the particular application. In general this layer can vary from about 0.5 to 8.0 mils (about 10–200 microns). The preferred substrate for automotive windshield applications is about 1 to 4 mils (25 to 100 microns). In the most preferred embodiment the substrate is a PET sheet having a thickness of about 2 mil (50 microns).

Substrate 16 may require some form of treatment to render its surfaces suitable for adhesion to the abutting materials. As indicated above, one surface of substrate 16 will support solar coating 18. Typically, the first of these coating layers, as described below, will be a dielectric material, e.g., a metal oxide, which generally can be deposited in adherent fashion without any need for substrate priming or adhesion promoting. The opposing surface of substrate 16 will generally be bonded to a safety film, e.g., PVB as described below. In this circumstance it is generally necessary to carry out some sort of adhesion promotion treatment on the substrate surface. This treatment can take a number of forms such as coating the substrate surface with a thin (e.g., 50 angstroms) non-optical coating of a dielectric material; coating the substrate surface with an adhesive as described below; coating the substrate surface with chemical primers such as silanes; treating of the substrate surface by flame or by plasma or electron beam energy in a reactive atmosphere. It is even possible as described in more detail below to employ an adhesion promoting coating (e.g., dielectric or adhesive) with desirable optical properties such as an antireflecting layer to aid in achieving the desired refractive index match.

Solar control film 20 is prepared by applying a multilayer coating 18 to substrate 16. Coating 18 is optically functional as an interference coating which serves, in a known way, to enhance visible transmission while reflecting radiation in the near infrared region of the spectrum. In accordance with the present invention the optical properties of solar control film 20 are controlled to provide overall characteristics of the safety glass laminate which mask the prominence of wrinkles in the substrate layer which detract from the appearance of the laminate.

In general, the contribution which the solar control film according to the present invention makes to visible reflectance of the complete laminate should be about 2% or less (based on total incident visible radiation). The contribution to reflection of visible light produced by the solar control film 24 in the preferred embodiment is one percent or less, and most preferably is less than 0.7 percent. The visible light reflection contribution of the remainder of the laminate will be around eight percent giving a total visible light reflection of ten percent or less. Prior automotive windshields have visible light reflection contributions for their solar films of three percent or greater, for a total which is usually more than eleven percent and can be as high as seventeen percent. The reflectance contribution values specified herein refer to observations from one or both sides of the laminate of this invention.

The primary method of achieving low visible reflectance contribution of the solar film in the laminate is by providing a specially-designed solar coating. It is also possible, as described below, to aid in achieving this objective by employing absorbing materials between the solar coating layers and the observer.

The solar coating 18 will now be described with reference to FIGS. 3 and 4. The solar coating in its most basic form will contain at least one thin electrically conductive, near infrared reflecting metal layer and at least one adjacent adherent layer of a dielectric material, these layers which when operatively positioned in the coating contribute the required low visible reflection. For automotive windshield applications the metal layer(s) may also be chosen to provide for defrosting by electrical resistance heating.

Figure 3:
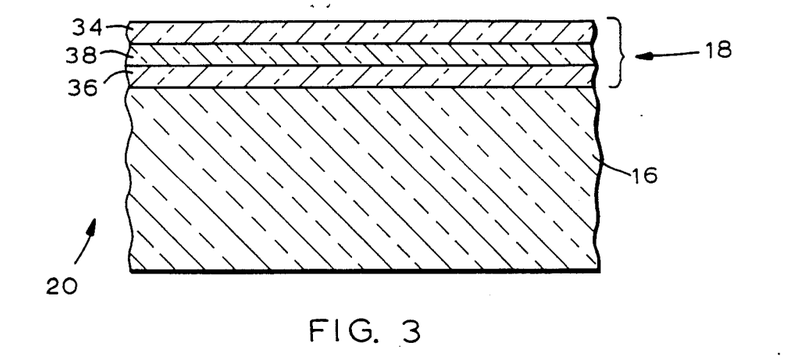
FIG. 3 is an enlarged view of a section of the solar control film portion of the laminate of FIG. 1 illustrating a first embodiment thereof.

The preferred basic coating unit is a three-layer coating of the type shown in FIG. 3. In this embodiment coating 18 comprises dielectric layers 34 and 36 on either side of metal layer 38. This basic stack of three layers can be doubled to give a five-layer design of the type shown in FIG. 4 where layers 40, 42, and 44 are dielectrics and 46 and 48 are metal layers. This is a 2X multiple of the three-layer because layer 42 while a single material is really two layers—the top of one three-layer stack and the bottom of another. This arrangement employing two or more spaced metal layers results in an interference filter of the Fabry-Perout type. Similarly, a seven-layer stack can be formed using three of the basic stack modules. The higher multiple stacks (e.g., five-layer, seven-layer, nine-layer, etc.) generally are more desirable since they provide higher total solar rejection while maintaining acceptable low visible reflection. See International Application PCT/US87/02027.

In general the optical design of interference coatings is known. Among the suitable metals for the metal layer(s) are silver, palladium, aluminum, chromium, nickel, copper, gold and alloys thereof as well as other alloys such as brass and stainless steel. For optical purposes the preferred metal is silver.

Metal layer 38 (FIG. 3) and metal layers 46 and 48 (FIG. 4) should be continuous and thereby highly conductive to maximize both defrosting characteristics and near infrared solar reflection. The metal layer(s) should be relatively thin to reduce reflected color which can be particularly undesirable at oblique viewing angles. When used with known dielectrics of high refractive index as hereinafter described, the thickness of metal layers 38, 46 and 48 should generally be in the range of about 60 to 120 angstroms with layers of less than 110 and preferably less than 100 angstroms preferred for most applications. Preferred thickness for this layer in automotive applications is about 80 to 120 angstrom with about 90 angstroms being most preferred. This use of relatively thin metal layers, of course, results in a concomitant decrease in solar reflection.

Figure 4:
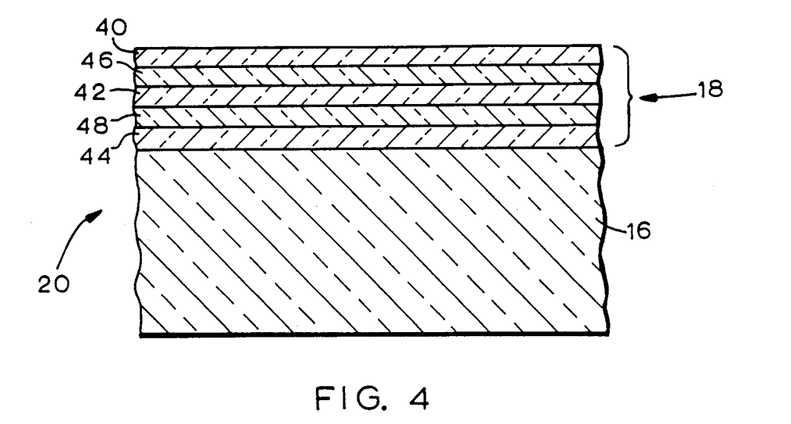
FIG. 4 is a view similar to FIG. 3 illustrating a second embodiment of the solar control film portion of the present invention.

Solar coating 18 also contains one or more dielectric layers shown in FIGS. 3 and 4 as 34, 36, 40, 42, and 44. These layers, conventionally employed in solar control films, should be essentially transparent over the solar range (i.e., from 325 to 2125 nm).

In general the dielectric material should be chosen with a refractive index which is greater than the material outside the coating it abuts. For example, dielectric layer 36 of FIG. 3 abuts the substrate 16, typically PET which has a refractive index of about 1.64. Similarly, dielectric layer 34 will abut a layer of safety film 23, typically PVB which has a refractive index of about 1.5. In general a higher refractive index of the dielectric layers is desirable. It is preferred to employ dielectric materials with a refractive index of greater than about 1.8, and most preferred are dielectrics with refractive indices above about 2.0. Dielectric layers upon which a metal layer will be deposited, e.g., layers 36 of FIG. 3 and layers 44 and 42 of FIG. 4, should also be chosen to provide a suitable surface for this coating operation. Suitable dielectric materials for layers 34, 36, 40 and 44 include $ZrO_2$, $Ta_2O_5$, $WO_3$, $In_2O_3$, $SnO_2$, $In/SnO_x$, $Al_2O_3$, ZnS, ZnO and $TiO_2$. In the embodiment of FIG. 4, the refractive index of layer 42, which serves as a spacer layer for metal layers 46 and 48, is not as critical as that for layers 40 and 44. Accordingly, dielectric materials in addition to those listed above can be used for this spacer layer, e.g., SiO, $SiO_2$ and $MgF_2$. In general the refractive index need only be above about 1.5 for this spacer layer. The preferred dielectric materials for automotive applications are $WO_3$, $In_2O_3$ and $SnO_2$.

The thickness of the dielectric layers is chosen, in known fashion, to obtain an optical which provides maximum reflection suppression in the 500–600 nm wavelength region. Depending on the particular dielectric chosen this will generally require dielectric layer of from about 200–600 angstroms. A typical preferred three-layer construction of the type shown in FIG. 3 can comprise:

| layer 34 | $WO_3$ | 400 angstroms |
| layer 38 | Ag | 90 angstroms |
| layer 36 | $WO_3$ | 400 angstroms |

The same basic design criteria apply to the five-layer coatings shown in FIG. 4. Spacer layer 42 between the two metal layers generally can be about twice the thickness of other dielectric layers (e.g., 400–1200 angstroms). A typical preferred five-layer construction of the type shown in FIG. 4 can comprise:

| layer 40 | $WO_3$ | 40 angstroms |
| layer 46 | Ag | 90 angstroms |
| layer 42 | $WO_3$ | 800 angstroms |
| layer 48 | Ag | 90 angtroms |
| layer 44 | $WO_3$ | 400 angstroms |

Individual layers of the solar coating are deposited by vacuum coating techniques well known in the art such as vacuum evaporation or sputtering. Usable methods include evaporation (resistance heated, laser heated, or electron-beam vaporization) and DC or RF sputtering (diode or magnetron) under normal or reactive conditions.

After preparation of solar control film 20, this film is bonded to at least one layer of safety film of the type normally used in safety glass or shatterproof laminated windows to form a composite solar/safety film 24 (FIG. 1). The known function of this safety film is to absorb energy of impact on the laminate and prevent glass from flying off the laminate after it is broken.

The functional requirements of this safety film include (1) good adhesiveness to glass, (2) good modulus of elasticity, (3) good refractive index match for glass (i.e., near 1.5), (4) good optical clarity, and (5) good optical stability over the useful life of the window.

Among the suitable flexible transparent plastic film-forming materials for this safety film are plasticized polyvinyl butyral (PVB), polyurethanes, polyvinyl chloride, polyvinyl acetal, polyethylene, ethylene vinyl acetates and the like. The preferred safety film is a plasticized PVB sold by Monsanto Company as SA-FLEX®, TG sheet. See U.S. Pat. No. 4,654,179.

Figure 2:
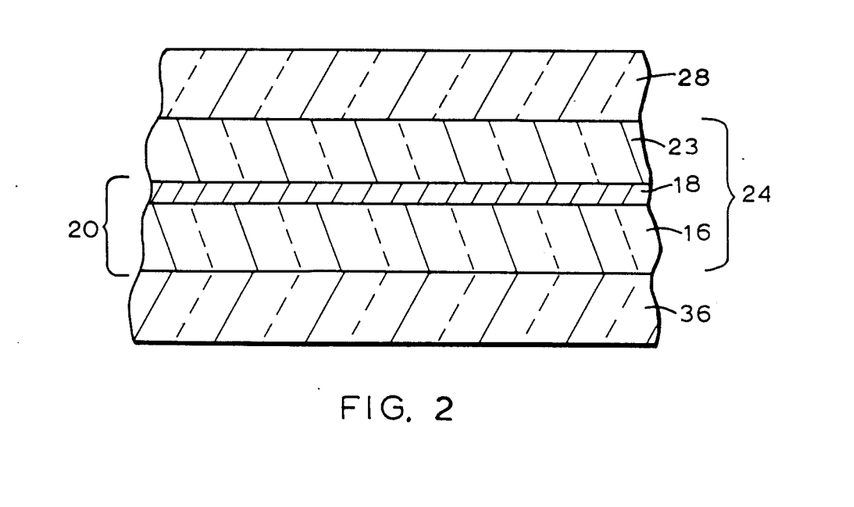
FIG. 2 is a cross-sectional view of another embodiment of a safety glass laminate of the present invention.

The preferred composite solar/safety film 24 is shown in FIG. 1 as a sandwich of the solar control film 20 encapsulated between two safety film sheets 22 and 23. In an alternative embodiment shown in FIG. 2, composite solar/safety film 24 comprises solar film 20 and bonded to one surface thereof, safety film 23. In this embodiment substrate 16 of solar control film 20 is bonded directly to glass layer 30 with, for example, a suitable transparent adhesive. In the preferred embodiment where the substrate is PET, adhesives which can be employed include polyester adhesives (e.g., Nos. 46960, 46971 and 46690 in DuPont Technical Bulletin No. 17—"Polyester Adhesives"), polyamide resin adhesives such as "Versalon" 1140 (General Mills), and a wide variety of vinyl resin-based adhesives used in the safety glass-type construction industry. In other embodiments, it is possible to laminate a composite solar/safety film of the type shown in FIG. 2 directly to a single piece of glass or to a conventional safety glass laminate (e.g., a glass/PVB/glasslaminate). In these last two embodiments it may be necessary to include on the back side of the solar film substrate (i.e., side opposite the solar coating) an antireflecting coating layer(s). In any of the embodiments described herein the use of antireflecting coatings on the substrate backside can be employed to further lower the reflectance contribution of the solar films. The interface between PET and PVB for example produces a reflectance contribution increase of about 0.3%, due to refractive index mismatch. PET interfaces with other materials, e.g. air, will result in different values. In a known manner the thickness of the antireflective layer can be specified based on its refractive index in accordance with the following equation (for the PET/PVB interface):

$$n = \sqrt{n_{PET} * n_{PVB}}$$

Using this equation results in a refractive index of 1.55. Using a material with a refractive index of 1.55 in order to obtain a quarter wavelength antireflection filter at 550 nm, the antireflection layer would need to be approximately 887 angstroms thick.

Safety films 22 and 23 preferably are provided as manufactured with one rough surface 26 or 27 and the opposite surface being relatively smooth. See U.S. Pat. No. 4,654,179, columns 5 and 6. The resulting rough outer surface of the composite solar/safety film permits optimum lamination to glass layers 28 and 30 by providing escape pathways for air entrapped between the layers during the conventional lamination process described below.

In the embodiment shown in FIG. 1 it is not necessary for safety film layers 22 and 23 to be of the same thickness, or even the same material. The thickness of each safety film layer can vary with design requirements but generally should be about 5 to 60 mils (125-1500 microns). In the preferred embodiment of FIG. 1 the total thickness of layers 22 and 23 should be about 30 mils, with the most preferred configuration consisting of equal 15 mil layers.

In one embodiment of the present invention the contribution to visible reflection of the solar control film after incorporation into the final laminate is kept below about 2.0% by including an absorbing element between the observer and the solar film. One way to accomplish this objective is to include a dye or pigment in the safety film, on one side or both or in one or both of the glass layers. This approach may not be preferred in automotive windshield applications where it is necessary to keep visible transmission of the laminate above about 70%. Another absorption approach can involve the use of vapor deposited absorption coatings, e.g., thin layers of certain metals such as tungsten, nickel or chromium. The visible light absorbing coating can alternatively be deposited on the substrate layer or the solar control coating.

Figure 5:
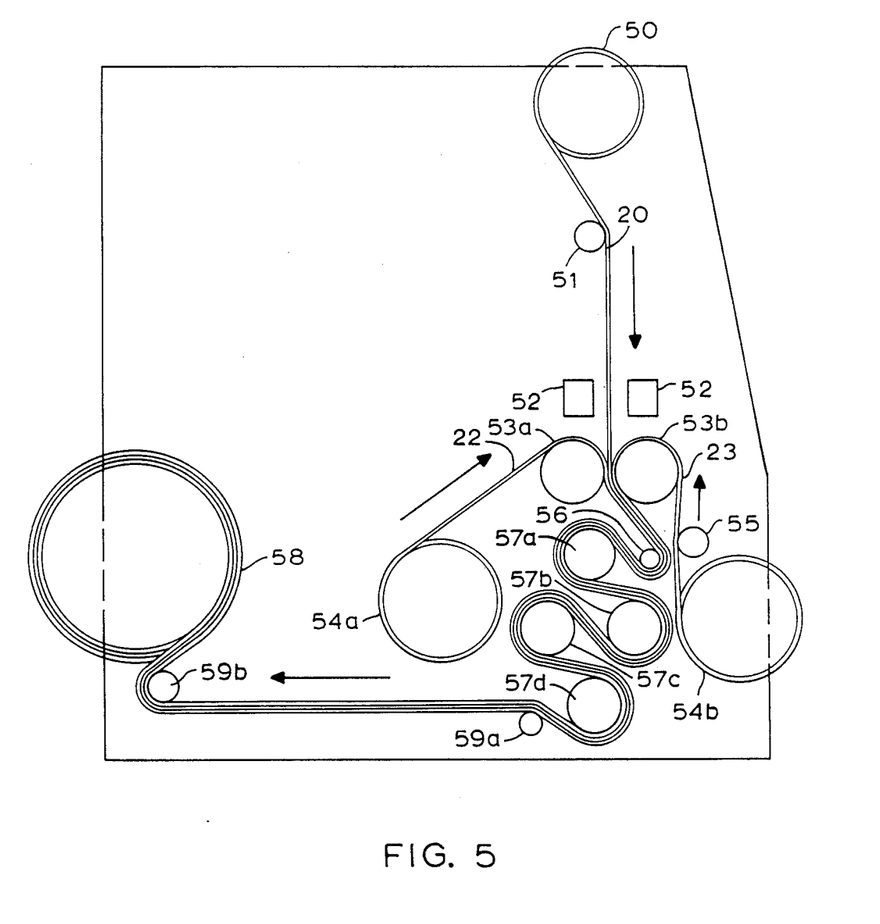
FIG. 5 is a schematic drawing of one embodiment of an apparatus for forming a composite solar/safety film of the present invention.

Formation of the preferred composite solar/safety film will now be described in connection with FIG. 5. In general, the solar film 20 (e.g., five-layer coated PET) is encapsulated, i.e., lightly bonded, between two layers of safety film 22 and 23 (e.g., PVB, each 15 mils thick) in a nip roll bonding process. Solar film 20 is supplied from roll 50 and first passes over tension roll 51. This solar film then can be subjected to moderate surface heating at stations 52. Heating stations 52 can be positioned to heat either the solar film, the PVB sheets or both. Heating should be to a temperature sufficient to promote temporary fusion bonding, i.e., the surfaces of the PVB become tacky. Suitable temperatures for the preferred materials are in the range of 120° to 250° F., with preferred surface temperatures reaching about 150° F.

Solar film 20 next is fed along with PVB layers 22 and 23 to nip rolls 53a, 53b (which are rotating in opposite directions) where the three layers are merged together under moderate pressure to form a weakly bonded composite solar/safety film. The PVB sheets are supplied by rolls 54a, 54b and the supply line can include tension rolls such as shown at 55. If desired, nip rolls 53a, 53b also can be heated to promote the bonding process. The bonding pressure exerted by the nip rolls can vary with the film materials and temperature employed but generally will range from about 10-75 psi, and preferably about 25-30 psi.

The tension of the composite solar/safety film is controlled by passage over idler roll 56. Typical line speeds through the roll assembly are in the range of five to thirty feet per minute. Proper control of speed and tension helps to minimize wrinkling of the PET substrate of the solar film.

After bonding between nip rolls the weakly bonded composite film is passed over a series of cooling rolls 57a, 57b, 57c, 57d which insure that the product taken up on roll 58 is not tacky. Process water cooling is generally sufficient to achieve this objective. Tension in the system is further maintained by idler rolls 59a and 59b.

The resulting composite solar/safety film has a bond strength of about 2-5 pounds per linear inch when tested according to the standard 180° peel test. This is sufficient to avoid delamination during normal handling of the composite film. This composite film typically is sold to laminators who complete the window assembly process as described below.

Despite the exercise of great care in effecting this bonding process, it is not presently possible to produce a composite solar/safety film 24 that does not exhibit wrinkling to the extend that the optical properties of the final windshield assembly are adversely affected. Thus, according to this invention the relationship between substrate wrinkling and visible light reflection contribution from the solar film is recognized. More specifically, the adverse optical effects of these wrinkles are masked by controlling to two percent or less the visible light reflection contribution of the solar film to the overall laminate. In this manner, the wrinkles are not eliminated but rendered less visible to the human eye since the reflection contribution of substrate layer 16 containing the wrinkles is purposely controlled below a predetermined visibility threshold.

The final component of the laminated window assembly of this invention is the outer layer(s) of rigid transparent material shown in FIG. 1 at 28 and 30. Layers 28 and 30 preferably are made of glass but rigid transparent plastics such as polycarbonates, acrylics and the like may also be employed.

The final step in the process for making the solar reflection safety laminate of the present invention is the lamination step in which the composite solar/safety film is laminated to at least one rigid transparent member. In the preferred product shown in FIG. 1 the laminate consists of a sandwich of the composite solar/safety film between two glass layers.

The composite solar/safety film of the present invention has the advantage that it can be used in the same manner and laminated employing the same equipment as that employed in forming conventional safety glass laminates, e.g., containing a single layer PVB safety film. The typical commercial safety glass lamination process comprises (1) laying up the three layer assembly, (2) passing the assembly through a pair of nip rolls at room temperature to expel trapped air, (3) heating the assembly, typically to about 100° C., for a short period, e.g., about 20 minutes, (4) passing the hot assembly through a second pair of nip rolls to give the assembly enough temporary adhesion to handle and (5) autoclaving the assembly typically at 260° to 300° F. and 160 to 190 psi for about 10 to 30 minutes. Using present known commercial lamination techniques it is not possible to press out or otherwise eliminate the solar film substrate wrinkles which adversely affect the product quality.

The present invention thus involves the application of the discovery that the ability of an observer to see wrinkles in the substrate layer 16 can be significantly reduced by limiting the contribution to the total laminate reflection made by the solar control film 20 (FIGS. 1 and 2) to a prescribed low value. In the preferred embodiment, the reflectivity contribution of the solar coated film to the total laminate reflectance is reduced by controlling the nature of the solar coating 18 on the substrate 16. For example, visible reflectance contribution of the solar control film is reduced by using thinner metal layers and by using dielectric materials with higher refractive indices and by judicious selection of dielectric thicknesses to insure that reflection suppression occurs at appropriate wavelengths in the visible region. The observed contribution of the solar control film can also be lowered to the desired level by placing an absorbing material between the observer and the solar control film.

In general, the prior art teachings point away from low film visible reflectance because it results in reduced solar reflection (and consequently higher heat loads) and lower conductance in the resulting windshield assembly 10. The prior art teaches that the reflection in the visible range should be high to maximize solar reflection. Lower reflection of the encapsulated solar control film 20 is also contraindicated for defrosting applications since it often involves using thinner metal layers in coating 18, resulting in decreased conductance and, therefore, less defrosting capability for a given applied voltage.

A method as explained below has been developed according to this invention for determining the contribution to total laminate reflection which is made by a composite solar/safety film 24 (FIG. 1); this is an indication of the visibility of the solar control film 20 and therefore is an indication of how apparent wrinkles in the film substrate 16 will be.

Figure 6:
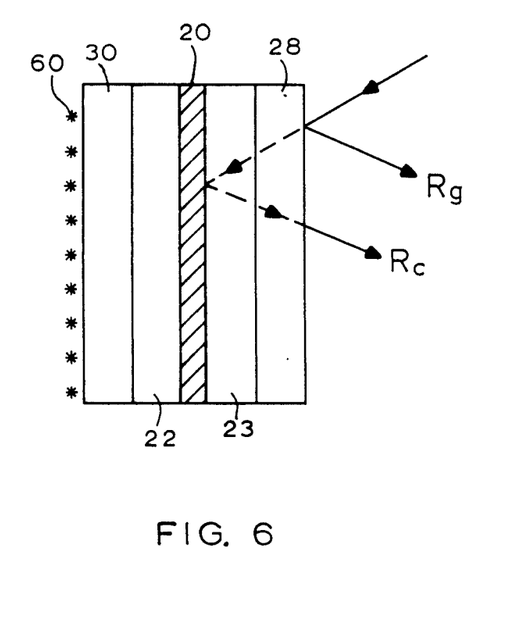
FIG. 6 is a cross-sectional view of a sample used in the determination, according to this invention, of the reflectance contribution of the composite solar/safety film.

The determination of contribution to total laminate (i.e., the multi-layered structure 10 of FIG. 1 which includes rigid layers 28, 30) reflection by the solar film (i.e., $R_c$) requires that one surface of the sample laminate be painted black as shown in FIG. 6. The sample laminate, similar to the laminated window 10 of FIG. 1, includes solar control film 20 which is encapsulated between safety film sheets 22,23 and which in turn is laminated between the rigid transparent members 28,30. The outside surface of sheet 30 is covered with black paint 60. In the preferred construction, solar reflecting film 20 is formed of PET with a sputtered solar coating, the safety film sheets 22,23 comprise PVB, and the rigid transparent members are panes of glass. The incoming and reflected light rays are shown in the drawing by the arrows, and the terms associated therewith are defined as follows:

$R_g$ = reflection of front glass surface:
$R_c$ = contribution to the total laminate reflection which is made by the composite solar/safety film.
$R_t$ = total measured reflectance for sample in FIG. 6.

From FIG. 4 it is evident that the total reflectance of that sample is given by:

$$R_t = R_g + R_c \qquad (eq. 1)$$

In this equation it has been assumed all glass/PVB layers are refractive indexed matched so that those interfaces do not contribute to measured reflectance. Note that both sides of the solar film may contribute to measured reflectance.

$R_t$ can be determined by directly measuring the reflectance of the sample shown in FIG. 6, and $R_g$ can be determined by measuring the reflectance of a plate of glass with the back thereof painted black.

From equation (1), it is obvious that the film's reflection contribution can be expressed as:

$$R_c = R_t R_g \qquad (eq. 2)$$

The equations given above refer to reflectances at a given wavelength. In any given equation, it is assumed that all parameters were determined for the same wavelength. Thus, for example, using equation (2), the reflectance contribution of the composite solar/safety film 20 at a certain wavelength can be determined. The calculation can be repeated at various wavelengths between 380 and 780 nm to obtain a visible reflection spectra for the film. That spectrum can then be weighted and integrated as described in ASTM standard method E308, to obtain a luminous reflectance (i.e., Y) based on the 1931 standard observer and either the A or C standard illuminants. (See also "Principles of Color Technology" by F. W. Billmeyer and M. Saltzman, Wiley & Sons, (1981) pages 34–45). The A illuminant, corresponding to an incandescent light, is used for quantifying the transmission of automobile windshields because that is the type illuminant used for night driving. The C illuminant, corresponding to overcast natural daylight, is used for describing reflection because that is the most likely illuminant under which the appearance of a windshield will be examined.

EXAMPLE 1

Samples were prepared as shown in FIG. 6 using as safety film layers 22 and 23, 15 mil sheets of SAFLEX® TG (i.e., plasticized PVB); as solar control film layer 20, a PET substrate with sputtered solar coatings as generally described above in connection with FIGS. 3 and 4; and as rigid transparent members 28 and 30, 2.2 mm thick plates of clear glass. The backs of the samples were painted with KRYLON Ultra Flat Black paint. Transmission and reflectance spectra were measured on a Perkin Elmer 330 spectrophotometer equipped with a Hitachi 60 mm integrating sphere. For each sample laminate containing a composite solar/safety film, two reflection spectra were measured, one before and one after painting one surface black. Using the procedures outlined above, the reflectance contribution spectrum for each solar film was determined.

Figure 7:
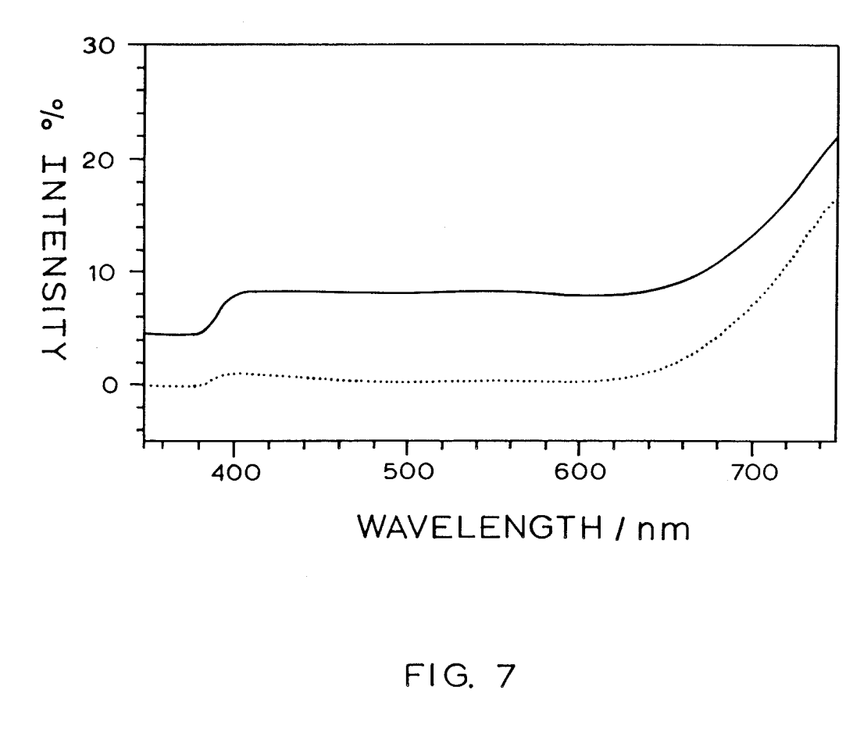
FIG. 7 is a reflectance spectra for one sample tested in Example 1.
Figure 8:
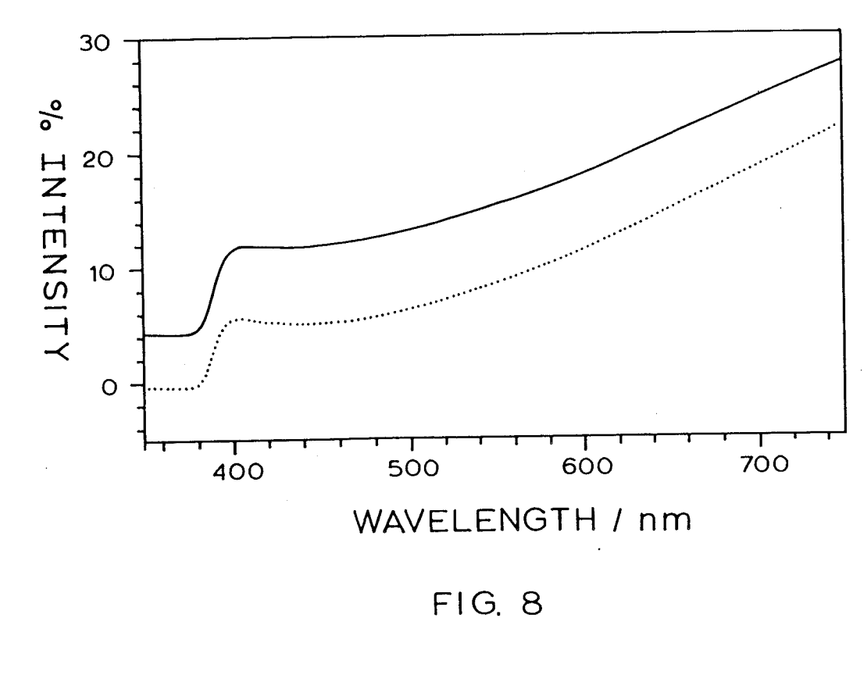
FIG. 8 is a reflectance spectra for another sample tested in Example 1.

In FIGS. 7 and 8, the reflectance contribution spectra of solar films are overlaid with the total reflectance spectra of the corresponding laminated samples (before being painted). FIG. 7 shows the reflectance spectra for sample Ho-107 where the solid line shows the total reflectance of the unpainted laminate, and the dotted line shows film reflectance contribution (i.e., $R_c$). FIG. 8 is a reflectance spectra for sample Ho-81 where the solid line shows the total reflectance of the unpainted laminate, and the dotted line shows the film reflectance contribution (i.e., $R_c$).

Using the methods described above, reflectance for laminated samples and for the solar film contribution to the laminate were determined, and are set forth below in Table 1. It should be noted again, that the luminous reflectance contribution (i.e., $R_c$lumC) determined for a solar control film 20 encapsulated within a laminated window which includes two outer panes of glass provides an approximate indication of how easy it is to see that film and therefore the wrinkles in the substrate.

TABLE 1

| Sample | % $R_t$(LumC) | % $R_c$(LumC) |
| --- | --- | --- |
| Ho-107 | 8.2 | 0.4 |
| Ho-102 | 7.5 | 0.6 |
| Ho-41 | 8.1 | 0.7 |
| Ho-39 | 9.3 | 2.7 |
| Ho-84 | 10.1 | 3.0 |
| Ho-85 | 13.3 | 6.3 |
| Ho-76 | 13.4 | 6.5 |
| Ho-101 | 14.3 | 7.1 |
| Ho-81 | 15.8 | 9.1 |
| Ho-80 | 19.7 | 13.4 |

Of the samples considered above, wrinkles in the substrate of the solar control film were quite difficult to see only in samples Ho-107, Ho-102, and Ho-41. These three samples had a solar control film reflection contribution of less than approximately 1%, low enough to successfully mask film wrinkles.

EXAMPLE 2

This example further demonstrates the use as described herein of low reflectance films to mask the visibility of wrinkles in PVB-encapsulated, PET-based, sputter-coated films. More particularly, this example demonstrates how high the film reflectance contribution can be before wrinkles in an encapsulated film become so evident as to be unacceptable in a commercial product.

It is noted that in the cases considered below, the PET wrinkles were never totally masked. However, the difficulty in detecting the presence of wrinkles varies drastically. To totally mask PET wrinkles would require that reflectance at the PET/PVB interface be approximately zero. However, even when clear PET is encapsulated, one can still see wrinkles with some effort. This is because the mismatch in refractive indices between PVB and PET (i.e., 1.47 vs. 1.64) leads to a modest reflection (approximately 0.3%) at that interface. Thus, for a single sheet of encapsulated clear PET there are two PVB/PET interfaces resulting in a total reflection of approximately 0.6%.

To determine the maximum acceptable film reflectance, films of various reflectivity were prepared and encapsulated within laminates using procedures described below which simulate full scale procedures and result in laminates exhibiting similar wrinkle problems. The optical properties of resulting laminates were evaluated visually and spectroscopically. It was found that when the film reflectance contribution exceeded 2%, preferably approximately 1%, wrinkles in the PET film were sufficiently evident to render the laminate unacceptable.

Encapsulation and Lamination Procedures (1) Two SAFLEX® TG sheets (relatively smooth on one side and textured on the opposite side) were cut to size and placed (separately) between two panels of ⅛ inch Teflon, and then heated in an oven at 100 degrees Centigrade for fifteen minutes.

(2) While the PVB was still hot, a sputter coated PET solar control film (at room temperature) was placed between the smooth sides of two PVB sheets. All polymer layers were oriented so as to have their machine directions aligned. While the Teflon and PVC were still hot, the prelaminate assembly (including the Teflon sheets) was passed through a Chemsultants International nip roller which exerted a sufficient pressure to tack the three polymer layers together.

(3) The nip rolled sample was allowed to cool to room temperature, for generally more than fifteen minutes.

(4) The composite solar/safety film was then put between two 2.2 mm thick plates of glass. This assembly was inserted between two panels of ⅛ inch corrugated cardboard and placed within a Carver heated press.

(5) The press platens were positioned so as to contact the outer cardboard panels and the sample was heated for fifteen minutes at 150 degrees Centigrade.

(6) While the temperature was held at 150 degrees Centigrade, the assembly was placed under 40 psi (i.e., 160 pounds for a 2×2 inch sample) for five minutes.

(7) While retaining the 40 psi pressure, the platens were cooled with cold water for ten minutes, and the sample was later removed from the press.

The PET used was Hostaphan #4400-400 from Hoechst Celanese (four mil thick). Sputtering was done on the bare side rather than on the side with a slip coating. A Leybold Heraeus Z400 sputter coater was used to prepare the 2×2 inch sputtered films. The general structure of the sputtered coatings was $WO_3/Ag/WO_3$. Samples with varying visible reflectance were prepared by varying the thickness of the silver layer. All other deposition parameters were held constant for the various samples. A detailed description of the deposition procedure follows:

(1) WO_3 (400 Angstroms)

Prepared by reactivity sputtering (dc magnetron) from a tungsten target (75 mm in diameter or 44 sq. cm. in area). Argon was fed into the chamber at 30 sccm and oxygen at 6 sccm to attain a pressure of ca. $3.5 \times 10^{-3}$ mbar. The power supplied to the target was 60 watts or 1.4 watts per sq. cm. The deposition time was 53 seconds.

(2) Ag (variable thicknesses)

Prepared by dc magnetron sputtering from a silver target (75 mm in diameter or 44 sq cm in area). Argon was fed into the chamber at 30 sccm to attain a pressure of ca. $2.5 \times 10^{-3}$ mbar. The power supplied to the target was 28 watts or 0.6 watts per sq. cm. The deposition rate was about ten angstroms per second.

(3) WO_3 (400 Angstroms)

The first 50 angstroms of this layer were reactivity deposited on the Ag under mild conditions (i.e., low wattage and low oxygen) so as not to damage (i.e., oxidize) the silver layer. The layer was applied by reactively sputtering (dc magnetron) from a tungsten target (75 mm in diameter or 44 sq. cm. in area). Argon was fed into the chamber at 30 sccm and oxygen at only 1 sccm to attain a pressure of ca. $3 \times 10^{-3}$ mbar. The power supplied to the target was limited to 18 watts or 0.4 watts per sq. cm. The deposition time was sixty seconds. The remaining 340 angstroms were deposited by reactivity sputtering (dc magnetron) from a tungsten target (75 mm in diameter or 44 sq. cm. in area). Argon was fed into the chamber at 30 sccm and oxygen at 6 sccm to attain a pressure of ca. $3.5 \times 10^{-3}$ mbar. The power supplied to the target was 60 watts or 1.4 watts per sq. cm. The deposition time was about forty-five seconds.

The optical properties were analyzed using the methods described previously. The spectroscopically determined parameters are given below in Table 2.

TABLE 2

| Sample | Description | % R_f(LumC) | % R_c(LumC) |
| --- | --- | --- | --- |
| — | Clear PET | 8.8 | 0.58 |
| I02 | 90 A silver | 9.1 | 1.22 |
| I03 | 100 A silver | 10.3 | 2.33 |
| I01 | 110 A silver | 11.7 | 4.15 |
| I04 | 120 A silver | 12.1 | 4.47 |
| H92 | 220 A silver | 33.5 | 27.28 |

Figure 9:
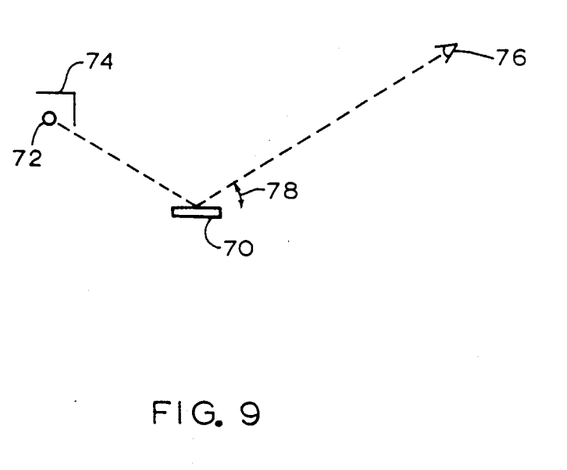
FIG. 9 is a diagram illustrating the arrangement used to assess the appearance of laminate samples in Example 2.

The procedure used to evaluate the appearance of the laminated samples is shown in FIG. 9. Referring thereto, it is seen that the laminate sample 70 having a dark background is positioned between a fluorescent light 72, which is behind shielding 74, and the observer 76 so that the angle 78 of incidence and reflection is generally thirty-four degrees, the distance in the "yY" direction of FIG. 9 between light 72 and sample 70 is forty centimeters, the distance in the "x" direction between light 72 and sample 70 is sixty centimeters, and the distance in the "x" direction between sample 70 and observer 76 is one hundred centimeters.

Sample I02 and the clear PET sample were the preferred ones, and wrinkles in the PET film were quite prominent in the other samples. Thus the maximum acceptable limit for the film reflectance contribution is approximately 2% and an upper limit of only 1% is preferred.

EXAMPLE 3

To demonstrate the use of a pigmented (tinted) interlayer to reduce reflection from an encapsulated solar film, sample I47 was prepared. The construction of the final laminate of this sample was:

glass #1 (2.2 mm)/15 mil clear SAFLEX/solar coating/4 mil PEt/pigmented 15 mil SAFLEX/glass #2 (2.2 mm).

The pigmented interlayer thereof was commercially available as Mass Pigmented SAFLEX Interlayer 365500 (light neutral brown). This interlayer when placed between two plates of glass gives an interlayer with a visible transmission of ca. 55%.

The solar coating was prepared as described in Example 2 above for samples I01-I04 with the silver layer thickness being ca. 110 angstroms. The lamination procedure used was identical to that described in Example 2.

Sample I47 allows one to observe the desirable effect of reduced visible reflectance. When viewed from the high reflectance side (i.e., through glass #1) wrinkles in the film were more evident than when viewed from the opposite side (i.e., through glass #2). This is supported by the differences, as set forth below in Table 3, in film reflectivity as observed from opposite sides. These reflectivities were measured or calculated as described above.

TABLE 3

| Observation Direction | LumC % R(Lam) | LumC % R(Film) |
| --- | --- | --- |
| clear side (glass #1) | 8.63 | 2.14 |
| pigmented side (glass #2) | 6.97 | 0.76 |

Accordingly, while sacrificing slightly, but not unduly, the thermal rejection and conductance resistivity properties of the windshield 10, the substrate wrinkles are made effectively transparent by this invention, thereby remedying the problem without extra manipulation of the PET substrate sheet 16 during the laminate manufacturing process, and in a manner which is commercially practical. Additionally, the use of the present low reflectance film makes any dust and other debris introduced into the laminate during the preparation thereof harder to see.

From the foregoing detailed description, it will be evident that there are a number of changes, adaptations, and modifications of the present invention which come within the province of those skilled in the art. However, it is intended that all such variations not departing from the spirit of the invention be considered as within the scope thereof as limited solely by the claims appended hereto.

We claim:

1. A composite solar/safety film for use in a laminated window assembly comprising:
   a flexible, transparent plastic substrate layer having a carrier surface and an opposing back surface;
   a multilayer solar control coating on said carrier surface, said coated substrate defining a solar control film; and
   at least one flexible, transparent, energy absorbing plastic safety layer bonded to a surface of said solar control film;
   wherein said solar control film contributes no more than about 2% visible reflectance, based on total visible incident radiation, in a laminated window assembly containing said composite solar/safety film laminated to at least one rigid transparent member.

2. The composite solar/safety film of claim 1 wherein said solar control film contribution to visible reflection is no more than about 1%.

3. The composite solar/safety film of claim 1 wherein said solar control film contribution to visible reflection is no more than about 0.7%.

4. The composite solar/safety film of claim 1 wherein said substrate layer has a thickness of from about 10 to about 200 microns.

5. The composite solar/safety film of claim 1 wherein said substrate layer has a visible light absorbing coating.

6. The composite solar/safety film of claim 1 wherein said solar control coating has a visible light absorbing coating.

7. The composite solar/safety film of claim 1 wherein said multilayer solar control coating comprises at least one electrically conductive, near infrared reflecting metal layer and at least one adjacent adherent layer of a dielectric material.

8. The composite solar/safety film of claim 7 wherein said layer of dielectric material has a thickness of from about 200 to about 600 angstroms.

9. The composite solar/system film of claim 7 wherein said dielectric material has a refractive index of at least about 1.8.

10. The composite solar/safety film of claim 7 wherein said multilayer solar control coating comprises, in order outward from said carrier surface, a first layer of dielectric material, a layer of metal, and a second layer of dielectric material.

11. The composite solar/safety film of claim 10 wherein said first and second layers of dielectric material each have a thickness of from about 200 to about 600 angstroms, said dielectric materials has a refractive index of at least about 1.8, said layer of metal has a thickness of from about 60 to about 120 angstroms, and said metal is silver.

12. The composite solar/safety film of claim 10 wherein said first layer of dielectric material is about 400 angstrom thick and comprises $WO_3$, said metal layer is about 90 angstroms thick and comprises silver, and said second layer of dielectric material is about 400 angstroms thick and comprises $WO_3$.

13. The composite solar/safety film of claim 7 wherein said metal is selected from the group consisting of silver, palladium, aluminum, chromium, nickel, copper, gold, brass, stainless steel and alloys thereof.

14. The composite solar/safety film of claim 13 wherein said metal is silver.

15. The composite solar/safety film of claim 13 wherein said metal layer has a thickness of from about 60 to about 120 angstroms.

16. The composite solar/safety film of claim 7 wherein said dielectric material is selected from the group consisting of $ZrO_2$, $Ta_2O_5$, $WO_3$, $In_2O_3$, $SnO_2$, $In/SnO_x$, $Al_2O_3$, $ZnS$, $ZnO$ and $TiO_2$.

17. The composite solar/safety film of claim 16 wherein said dielectric material is $WO_3$, $In_2O_3$ or $SnO_2$.

18. The composite solar/safety film of claim 7 wherein said multilayer solar coating comprises, in order outward from said carrier surface, a first layer of dielectric material and a series of at least two alternating metal layer/dielectric layer sets.

19. The composite solar/safety film of claim 18 wherein said first layer of dielectric material is 400 angstroms thick and comprises $WO_3$, said first metal layer is 90 angstroms thick and comprises silver, said second layer of dielectric material is 800 angstroms thick and comprises $WO_3$, said second metal layer is 90 angstroms thick and comprises silver, and said third layer of dielectric material is 400 angstroms thick and comprises $WO_3$.

20. The composite solar/safety film of claim 18 wherein said multilayer solar coating is a five-layer coating comprising, in order outward from said carrier surface, a first layer of dielectric material, a first layer of metal, a second layer of dielectric material, a second layer of metal and a third layer of dielectric material.

21. The composite solar/safety film of claim 20 wherein said dielectric material of said first layer of dielectric material has a refractive index greater than 1.8, said first layer of dielectric material has a thickness of from about 200 to about 600 angstroms, said first layer of metal has a thickness of from about 80 to about 120 angstroms, said dielectric material of said second layer of dielectric material has a refractive index greater than 1.5, said second layer of dielectric material has a thickness of from about 400 to about 1200 angstroms, said second layer of metal has a thickness of from about 80 to about 120 angstroms, said dielectric material of said third layer of dielectric material has a refractive index greater than 1.8, and said third layer of dielectric material has a thickness of from about 200 to about 600 angstroms.

22. The composite solar/safety film of claim 1 wherein said substrate layer is selected from the group consisting of biaxially oriented polyesters, nylons, polyurethanes, acrylics, polycarbonates, polyolefins, cellulose acetates and triacetates, and vinyl chloride polymers and copolymers.

23. The composite solar/safety film of claim 22 wherein said substrate layer is biaxially oriented polyethylene terephthalate.

24. The composite solar/safety film of claim 1 wherein said substrate layer back surface has an adhesion promoting configuration.

25. The composite solar/safety film of claim 24 wherein said adhesion promoting configuration comprises said substrate layer back surface having been subjected to a prior treatment selected from the group consisting of flame treatment, plasma energy treatment in a reactive atmosphere, and electron beam energy treatment in a reactive atmosphere.

26. The composite solar/safety film of claim 24 wherein said adhesion promoting configuration comprises a further coating layer of a material selected from the group consisting of dielectrics, adhesives and chemical primers.

27. The composite solar/safety film of claim 26 wherein said further coating layer is optically functional as an antireflecting layer.

28. The composite solar/safety film of claim 1 wherein said safety layer is selected from the group consisting of plasticized polyvinyl butyral, polyurethanes, polyvinyl chloride, polyvinyl acetal, polyethylene, and ethylene vinyl acetates.

29. The composite solar/safety film of claim 28 wherein said safety layer is plasticized polyvinyl butyral.

30. The composite solar/safety film of claim 28 wherein said safety layer has a thickness of from about 0.005" to 0.060".

31. The composite solar/safety film of claim 28 wherein said solar control film is encapsulated between and bonded in face-to-face relationship with two safety layers.

32. The composite solar/safety film of claim 28 wherein said solar control film has bonded to the surface containing said solar control coatings, one safety layer.

33. The composite solar/safety film of claim 32 wherein said substrate layer back surface has bonded thereto an adhesion promoting layer.

34. The composite solar/safety film of claim 1 wherein said safety layer has enhanced visible light absorption characteristics.

35. The composite solar/system film of claim 34 wherein said safety layer is tinted or pigmented.

36. The composite solar/safety film of claim 34 wherein said safety layer additionally contains a visible light absorbing coating.

37. The composite solar/safety film of claim 1 wherein said rigid transparent member is selected from the group consisting of glass, polycarbonates and acrylics.

38. The composite solar/safety film of claim 37 wherein said rigid transparent member is glass.

* * * * *